April 1, 1930.  C. DEROSSI  1,753,081

AUTOMATIC APPARATUS FOR THE RAPID PRODUCTION OF AERATED WATER

Filed Nov. 14, 1927

Inventor,
Carlo Derossi.
By
Atty.

Patented Apr. 1, 1930

1,753,081

UNITED STATES PATENT OFFICE

CARLO DEROSSI, OF TURIN, ITALY

AUTOMATIC APPARATUS FOR THE RAPID PRODUCTION OF AERATED WATER

Application filed November 14, 1927, Serial No. 233,139, and in Italy November 26, 1926.

This invention relates to an apparatus for the automatic production of aerated water, in which the pressure of the carbonic acid gas contained in a bottle communicating with the apparatus through a suitable reduction cock causes the water to be completely aerated and to flow to the outside by a simple operation of cocks; pumps, agitators and every other moving part being done away with.

The apparatus comprises a water vessel of suitable size for the water to be aerated, an aerating vessel in constant communication with the water vessel bottom and mounted outside or inside this latter with cocks for drawing the aerated water; suitable means being provided for injecting carbonic acid in the form of finely subdivided streams from the bottle at will into the water vessel and into the aerator, or into the former only, by operating cocks or valves placed in the gas piping of the apparatus.

The accompanying drawing shows diagrammatically and by way of example a constructional form of the apparatus according to this invention.

Figure 1:
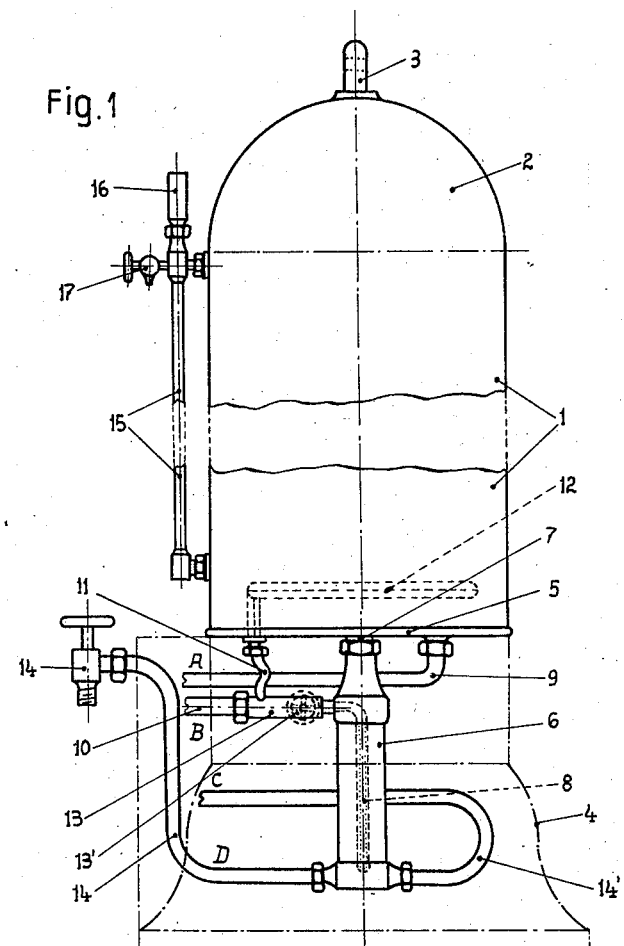
Figure 2:
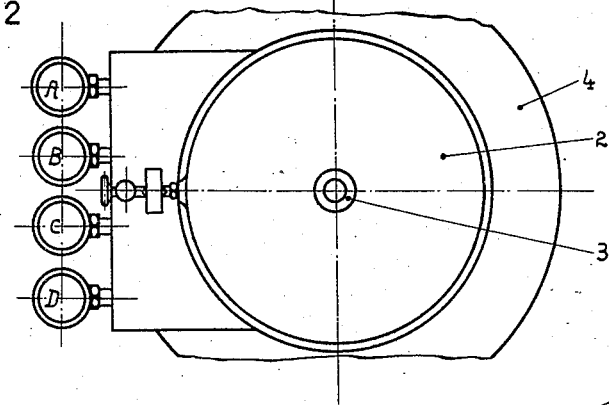

Figure 1 is a side elevation and Figure 2 a plan view.

In Figure 1 the broken line shows the foundation with which the apparatus is provided when, as required in most cases, it is to be used on a bar counter.

In Figure 2 the foundation is shown in full lines, but is partly broken away.
1 denotes the water vessel of a cylindrical shape with a top portion 2, carrying above the safety valve 3. The vessel 1 is supported by the foundation 4 shown in dotted lines in Fig. 1 and enclosing the aerator and the pipings to the operating cocks A—B—C—D secured outside the foundation and grouped in the most convenient position on the rear side thereof within the attendant's reach. Said cocks are clearly shown in plan view in Fig. 2, while in Figure 1 the same reference letters denote the extremities of the inner tubes, broken away for clearness sake and leading to the said cocks.

The aerator 6 is fixed to the bottom 5 of the water vessel 1 with which it constantly communicates through the connecting pipe 7. The aerator is cylindrical and encloses a coaxial tube 8 stoppered at the bottom and provided on its whole surface with a number of capillary holes. Through the aerator wall the tube 8 communicates with a connecting pipe 13 to which the gas is caused to flow from the bottle through the reduction cock by operating the cock B with which the connecting pipe 13 communicates through the tube 10. From the connecting pipe 13 is branched a pipe 11 entering the vessel through the bottom 5 and opening into an annular tube 12 or coil or the like, placed in proximity to the bottom of the vessel 1 and provided with a great number of capillary holes adapted to direct the gas admitted into the annular tube horizontally, vertically towards the bottom, or inclined at will between the said two directions. At the bottom of the vessel 1 opens the pipe 9 controlled by the cock A, supplied with water by the water main or a container situated at a sufficiently high level.

When it is not possible to feed water under a certain pressure, the vessel 1 is filled through the upper orifice which is opened by unscrewing the safety valve 3. A cock or valve 13' is provided in the connecting pipe 13 past the branch pipe 11 conveying the gas directly into the vessel 1; by closing the said cock or valve 13' the gas flow to the aerator is cut off, and the gas is supplied directly to the vessel 1. This latter is provided with a water level gauge 15 carrying above a manometer 16 and a cock 17 adapted for discharging any excess water during filling and for relieving the inner pressure. Two tubes 14, 14' are branched from the bottom of the cylindrical body of the areator 6 and abut to the cocks C, D secured to the foundation and adapted to control the aerated water served across the counter and the siphon filling, respectively.

The apparatus works as follows:

Water is admitted through the cock A into the vessel 1, so as to fill both the aerator and the water vessel up to the level controllable through the tube of the device 15.

The gas cock and the cock 13' of the connecting pipe 13 are then opened in order to inject carbonic acid gas in the form of finely subdivided streams into the aerator water and directly into the water in the vessel 1. The carbonic acid gas rapidly dissolves in the water owing to its complete and thorough mixing therewith and the excess gas collects underneath the vessel top. The degree of aeration of the water is ascertained by means of the manometer; when the proper degree is reached, the cock B is closed and the perfectly aerated water mass contained in the vessel and aerator is ready for use.

In order to draw the aerated water, the cocks C and D are operated, the former serving, as stated above, for directly serving the drink across the counter and the latter for filling the siphons. The pressure maintained in the vessel 1 allows all the aerated water to flow to the outside, said water remaining well aerated until it has all been drawn.

When it is desired to maintain the degree of aeration absolutely constant as long as there is any water in the apparatus the cock B is opened during drawing, in order to keep the pressure in the vessel 1 strictly constant. said pressure being controlled by means of the manometer 16.

Under such conditions the cock 13' is held open during filling of the siphons and the gas is injected simultaneously into the water vessel 1 and into the aerator, while when serving the drink across the counter the cock 13' is closed in order to prevent the gas, issuing through the holes of the pipe 8 of the aerator, from being carried along in an incompletely dissolved state and causing objectionable sprinkling as the drink is being served.

The size and shape of the apparatus and the number of aerating vessels employed for each apparatus are variable, said aerators being arranged either outside or inside the water vessel.

I claim:

1. An automatic apparatus for the rapid production of aerated water comprising in combination, a vessel for the water to be aerated, a hollow base for said vessel, an aerator located in said base and permanently connected with the bottom of said vessel, a tube provided with capillary holes axially arranged within the aerator, a gas supply conduit connected with said tube, a controlling valve in the gas conduit, a conduit for feeding the water to be aerated to said vessel, a valve in the water conduit, a conduit for the direct delivery of the aerated water, a distributing cock, in the last named conduit and a conduit provided with a control valve for filling the bottles, said valves being in alinement on one side of said base.

2. An automatic apparatus for the rapid production of aerated water, comprising in combination with a vessel for the water to be aerated and an annular perforated tube in said vessel near to its bottom for delivering the gas to the liquid mass contained in said vessel, of an auxiliary aerator consisting of a hollow cylindrical body arranged underneath the level in said vessel, a perforated tube axially arranged in said cylindrical body, said cylindrical body communicating constantly with the bottom of said vessel and the perforated tube being in adjusted communication with the source of gas, and aerated water supply tubes branched from the bottom of the aerator and arranged under the vessel.

In testimony that I claim the foregoing as my invention, I have signed my name.

CARLO DEROSSI.